(12) United States Patent  
Damola et al.

(10) Patent No.: US 8,965,351 B2  
(45) Date of Patent: Feb. 24, 2015

(54) METHODS AND APPARATUSES FOR EFFICIENT BATTERY UTILIZATION DURING CONTENT DELIVERY IN TELECOMMUNICATION NETWORKS

(75) Inventors: Ayodele Damola, Solna (SE); Lars Westberg, Enköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 143 days.

(21) Appl. No.: 13/375,690

(22) PCT Filed: Nov. 2, 2011

(86) PCT No.: PCT/IB2011/002595  
§ 371 (c)(1),  
(2), (4) Date: Dec. 1, 2011

(87) PCT Pub. No.: WO2013/008053  
PCT Pub. Date: Jan. 17, 2013

(65) Prior Publication Data  
US 2013/0017815 A1    Jan. 17, 2013

Related U.S. Application Data

(60) Provisional application No. 61/507,807, filed on Jul. 14, 2011.

(51) Int. Cl.  
*H04W 52/02* (2009.01)  
*H04W 28/22* (2009.01)

(52) U.S. Cl.  
CPC ............ *H04W 52/0258* (2013.01); *Y02B 60/50* (2013.01); *H04W 28/22* (2013.01)  
USPC .......................................... 455/418; 370/311

(58) Field of Classification Search  
CPC ....................................................... H04W 28/22  
USPC ................... 455/418, 522; 370/311, 335, 441  
See application file for complete search history.

(56) References Cited

U.S. PATENT DOCUMENTS

2008/0049660 A1    2/2008    Kwan et al.  
2008/0240009 A1*  10/2008   Min et al. ...................... 370/311  
2010/0184405 A1    7/2010    Chen et al.

OTHER PUBLICATIONS

Juangchuan Liu et al., "Proxy Caching for Media Streaming Over the Internet," Ch. 1, pp. 1-16, IEE Communications, Aug. 2004.  
Ericsson Labs; "Smartphone Traffic Impact on Battery and Networks"; <https://labs.ericsson.com/developer-community/blog/smartphone-traffic-impact-battery-and-networks>.

(Continued)

*Primary Examiner* — Phuoc H Doan  
(74) *Attorney, Agent, or Firm* — Patent Portfolio Builders PLLC

(57) ABSTRACT

Apparatuses and methods for controlling a manner of delivering content to a content user in a mobile telecommunication network are provided. The content is sent to the content user using first a first transmission rate when the content user is in a first radio state and uses a first battery power, and then using a second transmission rate that is lower than the first transmission rate, when the content user is in a second radio state and uses a second battery power that is smaller than the first battery power. The sending is performed such as, (A) while delivering the content, an amount of the content already received by the content user to exceed an amount of the content used by the content user, and (B) to minimize an energy used by the content user during delivery.

20 Claims, 9 Drawing Sheets

(56) References Cited

OTHER PUBLICATIONS

Global System for Mobile Communications; "3rd Generation Partnership Project; Technical Specification Group Radio Access Network; Interlayer Procedures in Connected Mode" (Release 5); 3GPP TS 25.3036 V5.3.0 (Jun. 2005); Valbonne France, pp. 1-74.

Visible Measures; Visible Measures research Brief; "Understanding Viewer Abandonment Trends in Short-Form Online Video Content" Sep. 2010.

International Preliminary Report on Patentability issued in corresponding International Application No. PCT/IB2011/002595, issued on Jan. 14, 2014.

International Search Report issued in corresponding International application No. PCT/IB2011/002595, mailed Mar. 29, 2012.

Written Opinion of the International Searching Authority issued in corresponding International application No. PCT/IB2011/002595, mailed Mar. 29, 2012.

Subhabrata Sen et al., "Proxy Prefix Caching for Multimedia Streams", Infocom '99. Eighteenth Annual Joint Conference of the IEEE Computer and Communications Societies. Proceedings. IEEE, Mar. 21-25, 1999, pp. 1310-1319, vol. 3, IEEE.

3GPP, "3rd Generation Partnership Project; Technical Specification Group Radio Access Network; Interlayer procedures in Connected Mode (Release 7)", 3GPP TS 25.303 V7.0.0, Mar. 2006, pp. 1-76.

* cited by examiner

METHODS AND APPARATUSES FOR EFFICIENT BATTERY UTILIZATION DURING CONTENT DELIVERY IN TELECOMMUNICATION NETWORKS

RELATED APPLICATION

This application is the National Phase of PCT/IB2011/002595 filed on Nov. 2, 2011, which claims priority under 35 U.S.C. 119(e) to U.S. Provisional Application No. 61/507,807 entitled "Methods and Apparatuses for Efficient Battery Utilization in Mobile Networks", filed on Jul. 14, 2011. All of which are hereby expressly incorporated by reference into the present application in their entirety.

TECHNICAL FIELD

The present invention generally relates to apparatuses, software and methods that establish the manner in which multimedia content is streamed towards user equipment (UE), to achieve an efficient utilization of the UE's battery by taking into consideration the potential abandonment of using the whole content.

BACKGROUND

Mobile and fixed user equipment (UEs) are capable to present multimedia content (e.g., video or audio clips) from various content providers in a telecommunication network. A variety of hardware and software generically named mobile cloud accelerator (MCA) concur in making possible to provide the content as promptly, efficiently and seamlessly as possible. For example, as illustrated in FIG. 1, a UE 10 (which can be mobile or fixed user equipment) receives multimedia content supplied by content providers 20 and 30, via MCA 40. Within the MCA 40, the actual manner of delivery of the content to the UE 10 may include various mechanisms like radio prioritization, proxy caching for example, using Akamai type content delivery network (CDN), and transparent internet cache (TIC), etc.

Depending on the manner in which the content is delivered, a user equipment (UE) may be in one of a plurality of states characterized by different power usage. For the purpose of illustration and not of limitation, a UE may be in one of four WCDMA radio states (as described, for example, in the latest edition of "WCDMA for UMTS: HSPA Evolution and LTE" by Harri Holma, Antti Toskala): high (when a Dedicated CHannel—DCH—is used), low (when a Forward Access Channel—FACH—is used), standby (when only a Paging Channel—PCH—may be used to access the UTRAN Registration Area—URA) and idle, when the UE is not connected to the network. These states and transitions there-between are illustrated in FIG. 2.

A "typical handset" has a 1000 mAh battery, although batteries of some smart-phones may have up to 1500 mAh. Timeouts are usually under the control of the network operator, not the handset or application.

In the Idle state, the UE is neither receiving nor transmitting. Live (although silent) TCP connections may be present. The power cost is low in the Idle state. There is also a PCH state, which is similarly low-power, and again it is only used when the UE is silent (i.e., neither receiving nor transmitting data). The current used in the Idle and the PCH state is about 8 mA—likely affected mainly by the energy profiler.

In the FACH state, the UE uses a shared channel for low-bandwidth communications. Packet sizes must be small—around 128 octets maximum, although actual size is controlled by the MNO. This threshold includes the overheads from TCP and TLS, which are 52 and 5 octets respectively, leaving around 70 octets for the payload data. Getting the UE in the FACH state takes around 2.5 s before the data can flow, although the power rises instantly when the transfer to FACH state is initiated. After a communication session ends, the UE remains in FACH state for a predetermined time (i.e., timeout).

In the FACH state, the current is about 120 mA, and the timeout is at least 8 seconds (but it may be be up to around 2 minutes). Operating a typical handset in the FACH state exhausts the typical handset battery in around 7 hours.

In the DCH state, the UE uses a dedicated channel for high (rate) bandwidth communications. As in the case of the FACH state, getting the UE in the DCH state takes around 2.5 s at the DCH power level, and there is a timeout after communication ends before the UE transitions into a lower power state. From the DCH state, some UEs drop to the FACH state and remain in this state for the duration of the FACH timeout, other UEs drop directly to the Idle/PCH state. Attempts to communicating more data than the FACH threshold rate may result in a transition of the UE to the DCH state, the transition taking, again, about 2.5 s.

In the DCH state, the current is about 250 mA and the timeout is at least 8 s. Operating a typical handset in the DCH state exhausts the typical handset battery in less than 3 hours. Transmission of data can use up to 2 W, and raising the level itself takes between 2 and 3 s to take effect—during which time the handset cannot receive or transmit, but still incurs the power cost. There are packets (e.g., signaling load) sent from and to the handset during this time.

The data rates, latency, and other resource usage are also different for different states, as illustrated on x-axis of FIG. 2. Transition between states (also illustrated in FIG. 2) occurs depending on whether data transfer activity is maintained (e.g., after predetermined time intervals with no activity), and on the ongoing application sessions. Relative power is represented on the y-axis of FIG. 2 (1 corresponding to a maximum).

Currently, parameter settings in mobile networks are not adaptable for different needs of various applications and are instead global. Therefore operators need to choose a parameter combination set based upon the application type that is most widespread in their network. For typical "Always on" applications, battery life is considered more critical, compared to slightly higher data transfer delay, and therefore setting lower inactivity times are preferred. Lower inactivity times also allow better utilization of network resources as the idle resources can be quickly re-allocated to other active users, increasing overall network capacity.

According to current version of 3GPP specification (as reflected in current versions of the documentation), in 3GPP networks, the radio states are set in the UE by signaling from the RRC function in the network. As shown in FIG. 2, there are different triggers for the transitions from one state to another.

However, the conventional systems and methods do not deliver content in a manner which takes into consideration user abandonment, thereby employing strategies that would minimize the energy used from the UE's battery. The energy stored in the battery may be fast and wastefully exhausted when used to a transfer of content that is not in fact played-out. Moreover, waste of bandwidth and gratuitous network load also occur by transferring content that is not actually used.

Different mobile terminal vendors have different approaches to conserving battery energy. When long (~850 secs) YouTube clip streaming patterns were provided to an Android terminal, it has been observed that Android terminal employs a strategy whereby the video download is started at a high rate and then the terminal begins to throttle the download rate. One can assume that the reason for doing this is to ensure that the radio is in a low state (Cell_FACH) during most of the download period and, thus, to conserve the UE battery power.

When similar long (~850 secs) YouTube clip streaming patterns were provided to an Apple terminal, it has been observed that the Apple terminal uses another strategy: the video is downloaded at the fastest possible rate and the then the radio is put into idle mode. Staying long in a high power state drains battery (energy is power multiplied with time). Also multiple transitions between states drain the UE battery. To increase the UE battery life, it is important that UE be transitioned into the 'Idle' state as quickly as possible, while still ensuring a good user experience.

The Apple terminal streams the content at high rate which means that the terminal will be in a high power state for a relatively long period and leads to fast battery drain. The Android terminal, after streaming content at a high rate in the beginning of the delivery, starts throttling the content by not emptying its TCP buffer and forcing the server to send at a lower rate. This manner of controlling content delivery has the effect that the terminal is in a FACH state for an extended period of time (longer than necessary for continuous delivery of the content), and, therefore, the UE battery is utilized inefficiently.

Accordingly, it would be desirable to provide controllers and methods capable to optimize the manner of delivering content towards user equipment in a telecommunication network, such as to efficiently use the UE's battery.

SUMMARY

Exemplary embodiments include distributed content delivery apparatuses (e.g., MCA) having at least one processor and an interface, and being configured to control a manner in which multimedia content is delivered to a user equipment (UE), such as to minimize the energy used from the UE's battery by taking into consideration the abandonment rate before playing-out the entire content. The abandonment rate before playing-out the entire content is taking into consideration by maintaining the amount of delivered content larger than the amount of used content only such as to maintain a smooth usage, but not rushing to deliver the content as soon as possible, because the energy and bandwidth used for the transfer are wasted if the content user abandons using the content.

Other embodiments include methods employed in controlling a content delivery towards a UE include determining a manner in which multimedia content is delivered to a user equipment (UE) such that to minimize the energy used from UE's battery by taking into consideration the abandonment rate before using the entire content.

These apparatuses and methods facilitate extending the UE's battery life and decrease bandwidth waste and network load.

According to an exemplary embodiment, an apparatus configured to control delivering content from a content source provider to a content user (UE) in a mobile telecommunication network is provided. The apparatus includes a processing unit configured to receive the content from the content source provider, and to send the content to the content user using first a first transmission rate when the content user is in a first radio state, and then a second transmission rate that is lower than the first transmission rate, when the content user is in a second radio state. The content user uses a first battery power while in the first radio state, and a second battery power while in the second radio state, the second battery power being smaller than the first battery power. The processing unit sends the content such as, while delivering the content, an amount of the content already received by the content user to exceed an amount of the content used by the content user, and to minimize an energy used by the content user.

According to another exemplary embodiment, a method for managing a delivery of content from a content source provider to a content user (UE) in a telecommunication network is provided. The method includes receiving the content from the content source provider, and sending the content to the content user using first a first transmission rate when the content user is in a first radio state, and then a second transmission rate that is lower than the first transmission rate, when the content user is in a second radio state. The content user uses a first battery power while in the first radio state, and a second battery power while in the second radio state, the second battery power being smaller than the first battery power. The sending operation is performed such as (A) while delivering the content, an amount of the content already received by the content user to exceed an amount of the content used by the content user, and (B) to minimize an energy used by the content user.

According to another exemplary embodiment, a computer readable medium storing executable codes which, when executed on a computer, make the computer to perform a method for managing a delivery of content from a content source provider to a content user (UE) in a communication network is provided. The method includes receiving the content from the content source provider, and sending the content to the content user using first a first transmission rate when the content user is in a first radio state, and then a second transmission rate that is lower than the first transmission rate, when the content user is in a second radio state. The content user uses a first battery power while in the first radio state, and a second battery power while in the second radio state, the second battery power being smaller than the first battery power. The sending operation is performed such as (A) while delivering the content, an amount of the content already received by the content user to exceed an amount of the content used by the content user, and (B) to minimize an energy used by the content user.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a content delivery system in a mobile network, for example, a system meeting the characteristics described in the current 3GPP documentation. However, the embodiments to be discussed next are not limited to these systems but may be applied to other existing content delivery systems, such as (but not limited to) WIFI systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
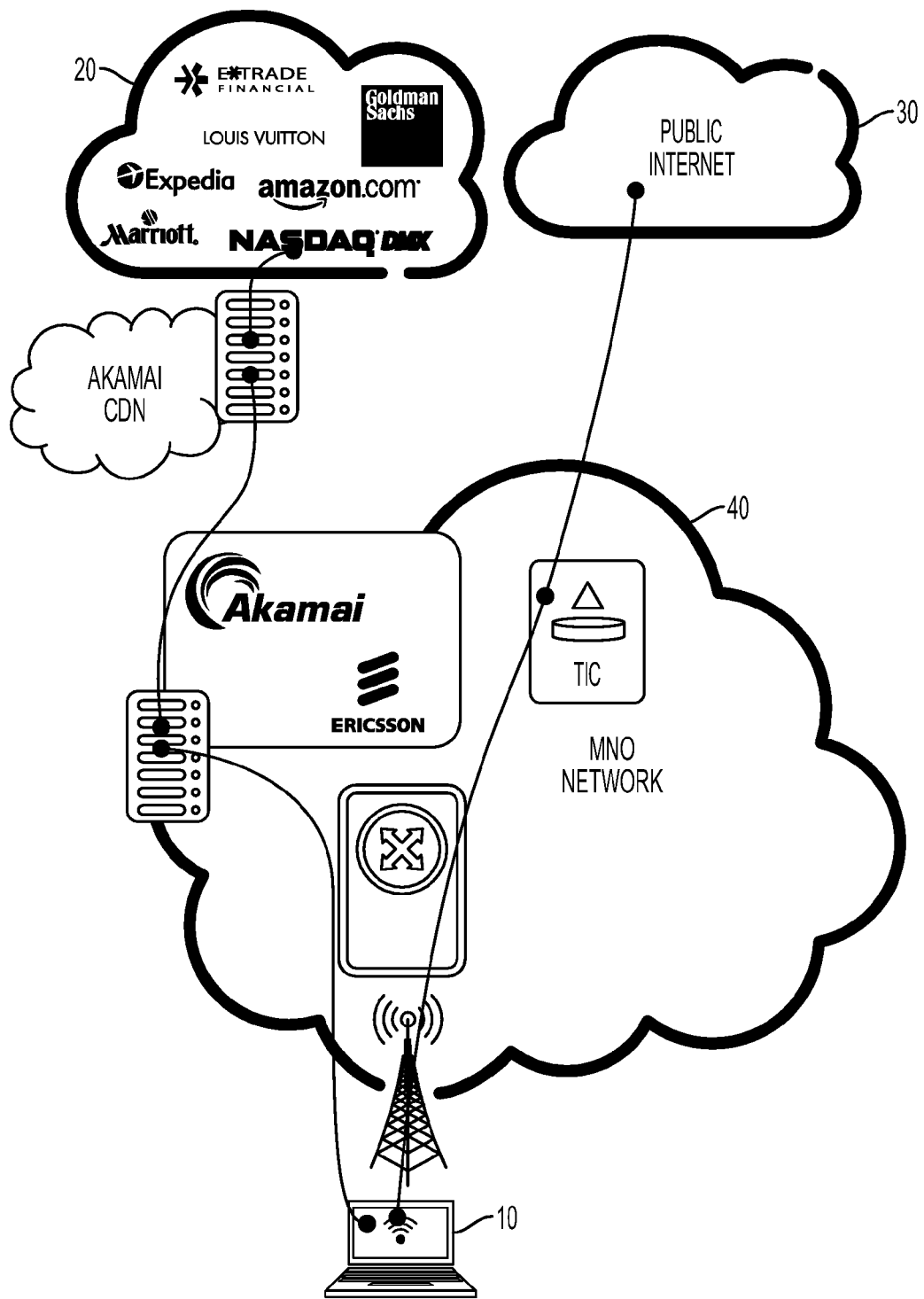
FIG. 1 is a schematic diagram of a conventional content delivery system.
Figure 2:
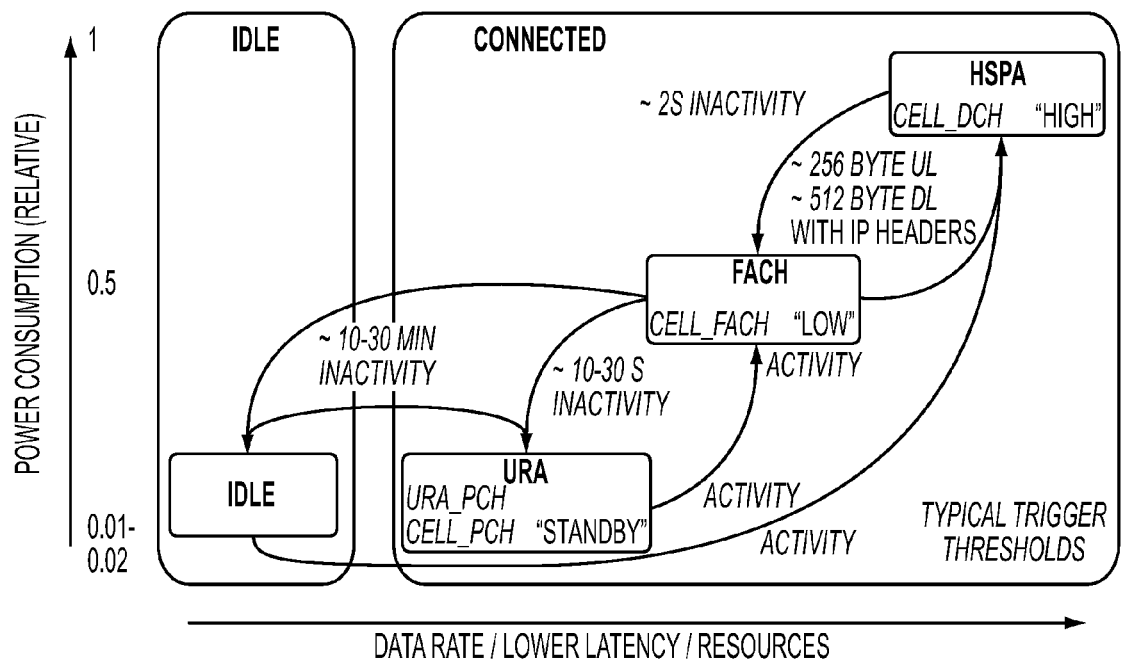
FIG. 2 is a graph-flow of states and transitions.
Figure 3:
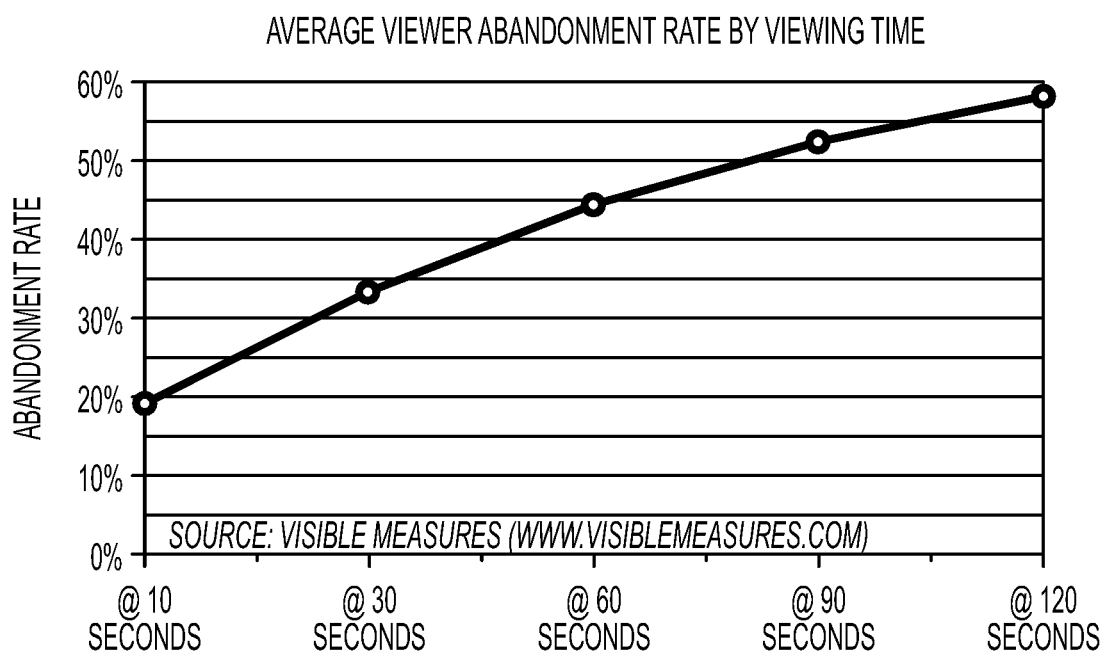
FIG. 3 is a graph illustrating abandonment rate relative to viewing time.

Studies have also shown that often a user abandons data transfer after using a relative small portion from the entire content. For example, when video is streamed (e.g., from a service such as YouTube), users often view just the first part of a video and skip the rest due to absence of interest in the content. FIG. 3 is a graph illustrating the correlation between the abandonment rate (on y-axis) and the viewed time (on x-axis). Thus, the longer the average viewer watches a clip, the more likely he or she is to abandon it. The benchmark initial abandonment rate of 19.4% is nearly double previously reported industry figures. Further, the rate of viewer abandonment increases along a relatively predictable trajectory: 33.4% abandonment at 30 seconds of playback; 44.1% abandonment at 60 seconds; 52.5% at 90 seconds; and 58.5% at 120 seconds.

Various embodiments of the inventive concept provide apparatuses and methods of finding a battery efficient mode of delivery a video stream, which takes into account the viewer abandonment factor. The embodiments may include using a proxy located between content source provider (i.e., the origin server), and the fixed or mobile user terminal (i.e., UE). The apparatus receives multimedia content from the content source provider, and determines a sequence of states to be used to send the video file to the terminal. Each state lasts a specific time interval during which the transfer is delivered using a certain transfer rate. In other words, the selection of a state also means the selection of a transfer rate. The content has to be delivered to the terminal (UE) such that to avoid a buffer under-run situation, in which a shortage of video data to be played-out occurs and the video play-out stops (i.e. a blank screen). Meanwhile the energy used for the delivery is sought to be minimized. To generalize without limiting, one may assume that the content is transferred using at least a first transmission rate when the content user is in a first radio state, and a second transmission rate that is lower than the first transmission rate, when the content user is in a second radio state. The content user uses more battery power while in the first radio state than when it is in the second radio state.

Figure 4:
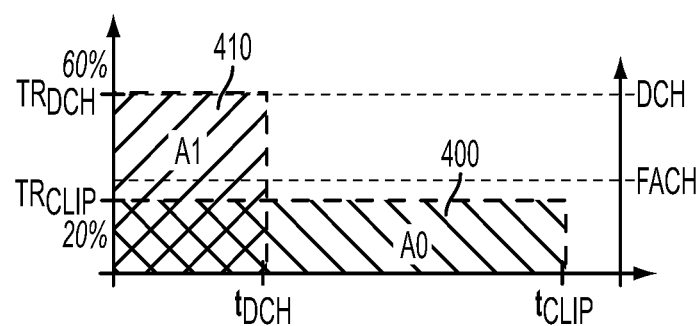
FIG. 4 is a graph illustrating a delivery of the whole content using only the highest data rate.

One simplistic strategy (illustrated in FIG. 4) is to send all the data using the first transmission rate. In FIG. 4, the y axis represents transmission rates and the x axis represents time. This simplistic strategy is represented as the line 410 where the transmission rate $TR_{DCH}$ is constant for $t_{DCH}$. Parallel with the content delivery, the content is played-out at $TR_{clip}$ for $t_{clip}$ time. The graph area $A_0=TR_{clip} \times t_{clip}$ is substantial equal with the graph area $A_1=TR_{DCH} \times t_{DCH}$ being an illustration of the size of the content (e.g., video clip). However, this "high-rate only" simplistic approach is not optimal, but it may be employed when the size of the clip is small.

Figure 5:
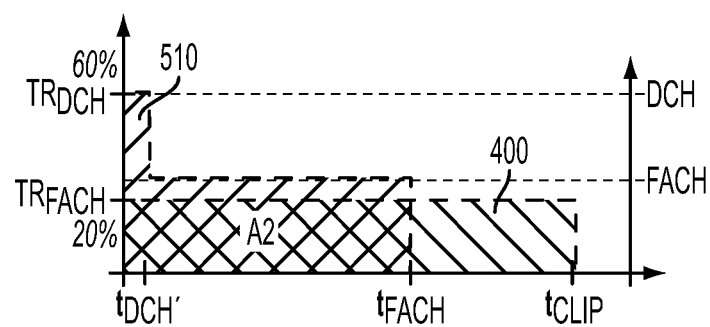
FIG. 5 is a graph illustrating a delivery of the content using different data rates, according to one exemplary embodiment.

A preferred strategy which is illustrated in FIG. 5, is to transmit first a burst of content (e.g., video data) in high radio state (DCH) at the beginning of the delivery, and, then to continue sending video data in a low radio state (FACH). In other words as represented by the line 510, the first transmission rate $TR_{DCH}$ is constant for $t_{DCH}$, and then, the second transmission rate $TR_{FACH}$ is constant until $t_{FACH}$. The effect of this strategy is that the delivery is paced out over time, and, if the viewer abandons using the content (i.e., watching the video clip), an amount as little as possible of video data is wasted (having already been delivered). The graph area $A_0=TR_{clip} \times t_{clip}$ is substantial equal with the graph area $A_2=TR_{DCH} \times t_{DCH}+FTR_{FACH} \times (t_{FACH}-t_{DCH})$ being an illustration of the size of the content (e.g., video clip).

Figure 6:
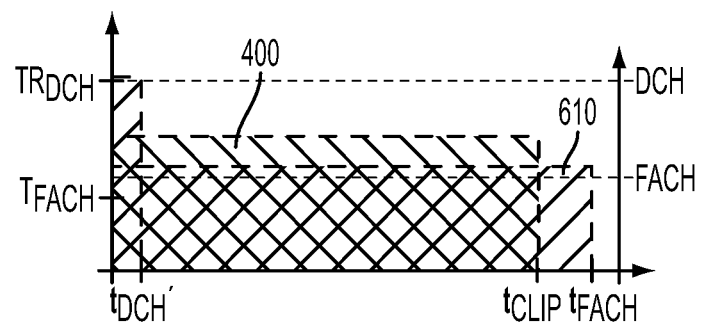
FIG. 6 is a graph illustrating another delivery of the content using different data rates, according to another exemplary embodiment.

In FIG. 5, the second transmission rate $TR_{FACH}$ is larger than the rate of using the content (i.e., at which the content is played-out) $TR_{clip}$. However, as illustrated in FIG. 6, the second transmission rate $TR_{FACH}$ may be smaller than the rate of using the content (i.e., at which the content is played-out) $TR_{clip}$. Depending on relative sizes of $t_{DCH}$, $t_{FACH}$, and $t_{clip}$ it is possible that the delivered content be exhausted and then the playout may be impeded by lack of content to be played as illustrated in FIG. 6.

Figure 7:
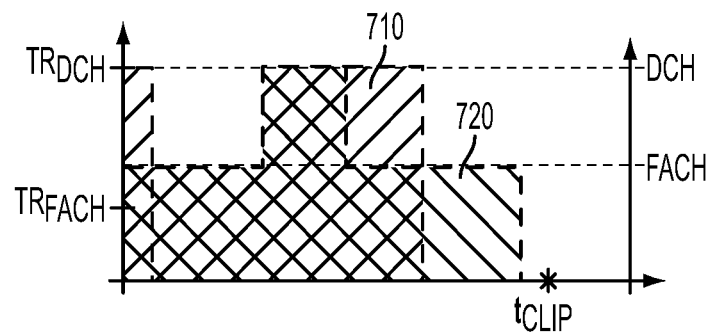
FIG. 7 is a graph illustrating other manners of delivering the content using different data rates, according to other exemplary embodiments.

In order to avoid the playout be impeded by lack of content to be played, another period of as illustrated in FIG. 7 another period of using the first (high) transmission rate may be employed. This additional period of using the first (high) transmission rate may last until the whole content is delivered as represented by 710, or only as long as to buffer enough delivered content to ensure that an amount of the content already received by the content user exceeds an amount of the content used by the content user, while delivering the content, as represented by 720. The manner of delivering the content, i.e., duration and sequence of using different transmission rates is such as, besides ensuring enough content to be played out, to minimize a time during which the content user is in the first radio state, wherein the content user uses a first battery power larger than a second battery power while in the second radio state.

The transition between states is also associated with a certain amount of signaling. The time and energy consumed during transition have also to be taken into consideration. The apparatus (or, more specific, a processing unit of the apparatus) is configured to send respective state configuring signals to the content user before starting to send the content using the first transmission rate or using the second transmission rate.

The optimization may include finding duration $t_{DCH}'$ of the transfer at high rate (in DCH state) at the beginning of the video content delivery, and implicitly the duration of the transfer at the low rate until the end of the video file delivery $t_{FACH}$. The energy consumed Q for transferring the video file to the terminal (UE) is power multiplied with time, and, thus, it is proportional to the current I multiplied with time t (the potential difference V being constant): Q=IVt. Some constraints have to be met: the data (transfer or played-out) rate multiplied with time for A2, A1, and A0 are equal. The minimum time at which video data is transferred at high rate may be required to be larger than a predetermined value, e.g., 10 s. The goal of the optimization is to use less battery energy when employing a strategy such as A2 than when, such as A1, only high delivery rate is used: $Q_{A2}<Q_{A1}$.

Figure 8:
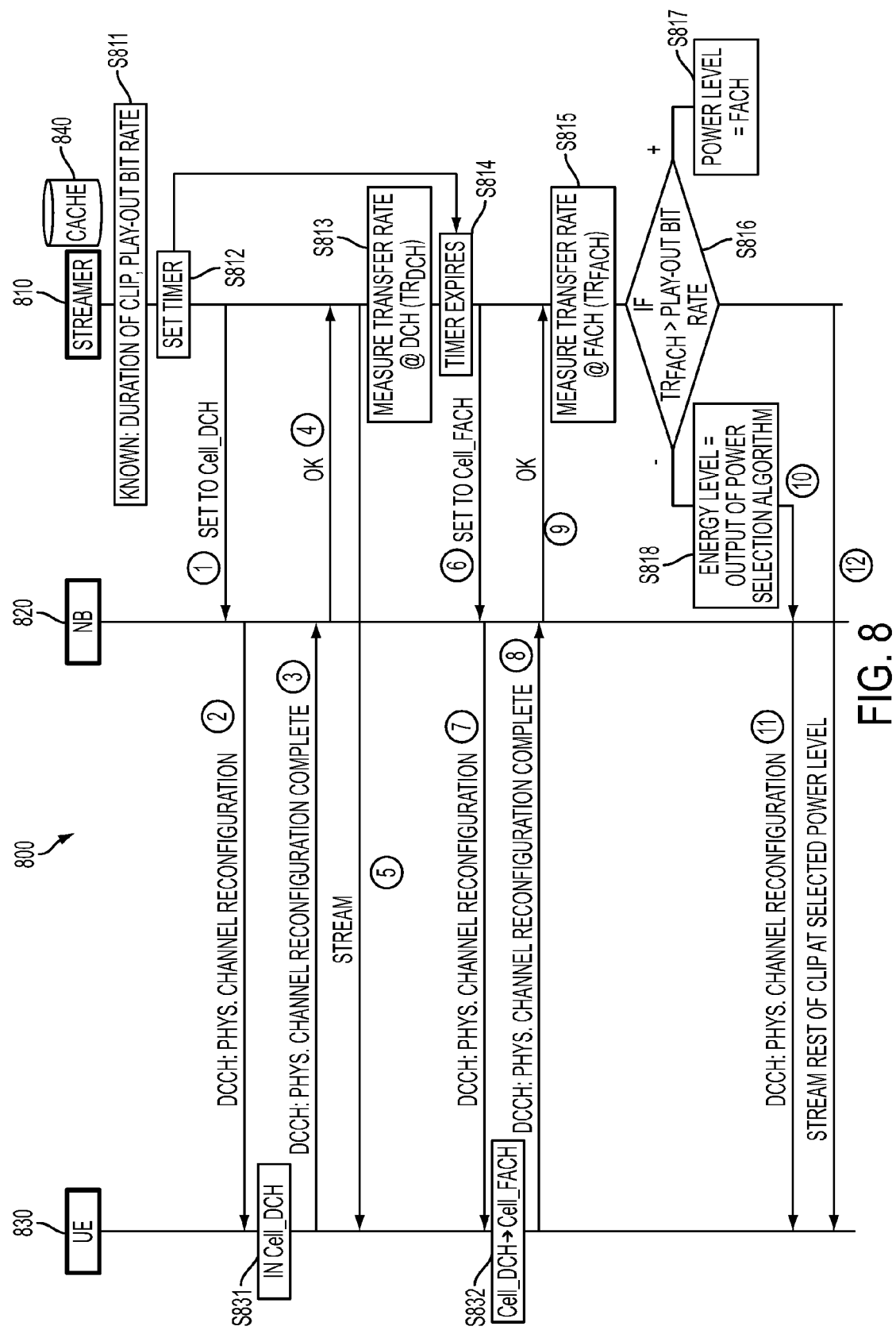
FIG. 8 is a flow diagram illustrating operations taking place while delivering a video file using a strategy according to an exemplary embodiment.

For example, FIG. 8 is a flow diagram illustrating operations taking place while delivering a video file using a strategy according to an exemplary embodiment, in a system 800. The apparatus 810 controls delivery of content towards the user equipment (UE) 830 via a base-station (NB) 820, eNodeB or WiFi access point. The apparatus 810 may be associated with a cache memory 840 where the content received from the content source is stored. The apparatus 810 learns or measures duration of the content (e.g., video clip) and playout rate at S811. The apparatus 810 also includes a timer (i.e., some time measuring means) that assists in measuring predetermined periods of time, such as $t_{DCH}$ during which the content is transferred using the first (high) transmission rate. At S812 the timer starts measuring $t_{DCH}$, and may provide a signal when $t_{DCH}$ expires.

The apparatus 810 sends a message "1" to NB 820 to signal the UE 830 to switch to the DCH state. NB 820 sends a reconfiguration message "2" accordingly. The UE 830 transitions to the DCH state and sends a message "3" to NB 820 regarding to this transition. NB 820 further informs the apparatus 810 about the transition via a message "4." Upon receiving the message "4," the apparatus 810 streams content towards UE 820 via NB 830 using the first (DCH) transmission rate as illustrated by "5." The apparatus 810 then measures (occasionally or monitors) an actual transfer rate $TR_{DCH}$ at S813.

After $t_{DCH}$ expires at S814, the apparatus 810 sends a message "6" to NB 820, to signal the UE 830 to switch to the FACH state. NB 820 sends a reconfiguration message "7" accordingly. The UE 830 transitions to the FACH state at S832, and sends a message "8" to NB 820 regarding to this transition. NB 820 further informs the apparatus 810 about the transition via a message "9."

The apparatus 810 then measures an actual transfer rate $TR_{FACH}$ at S815. The measured $TR_{FACH}$ is compared with the play-out rate at S816. If $TR_{FACH}$ is larger than the play-out rate (i.e., the "+" branch), the rest of the content is delivered while the UE remains in the FACH state. If $TR_{FACH}$ is smaller than the play-out rate (i.e., the "−" branch), at S818, the apparatus 810 uses an algorithm in which the used energy is evaluated to determine a manner of transmitting the rest of the content. The apparatus 810 also sends to sends a message "10" to NB 820, to signal the UE 830 to switch to the DCH state. NB 820 sends a reconfiguration message "11" accordingly. The rest of the message is then streamed as indicated by "12."

Figure 9:
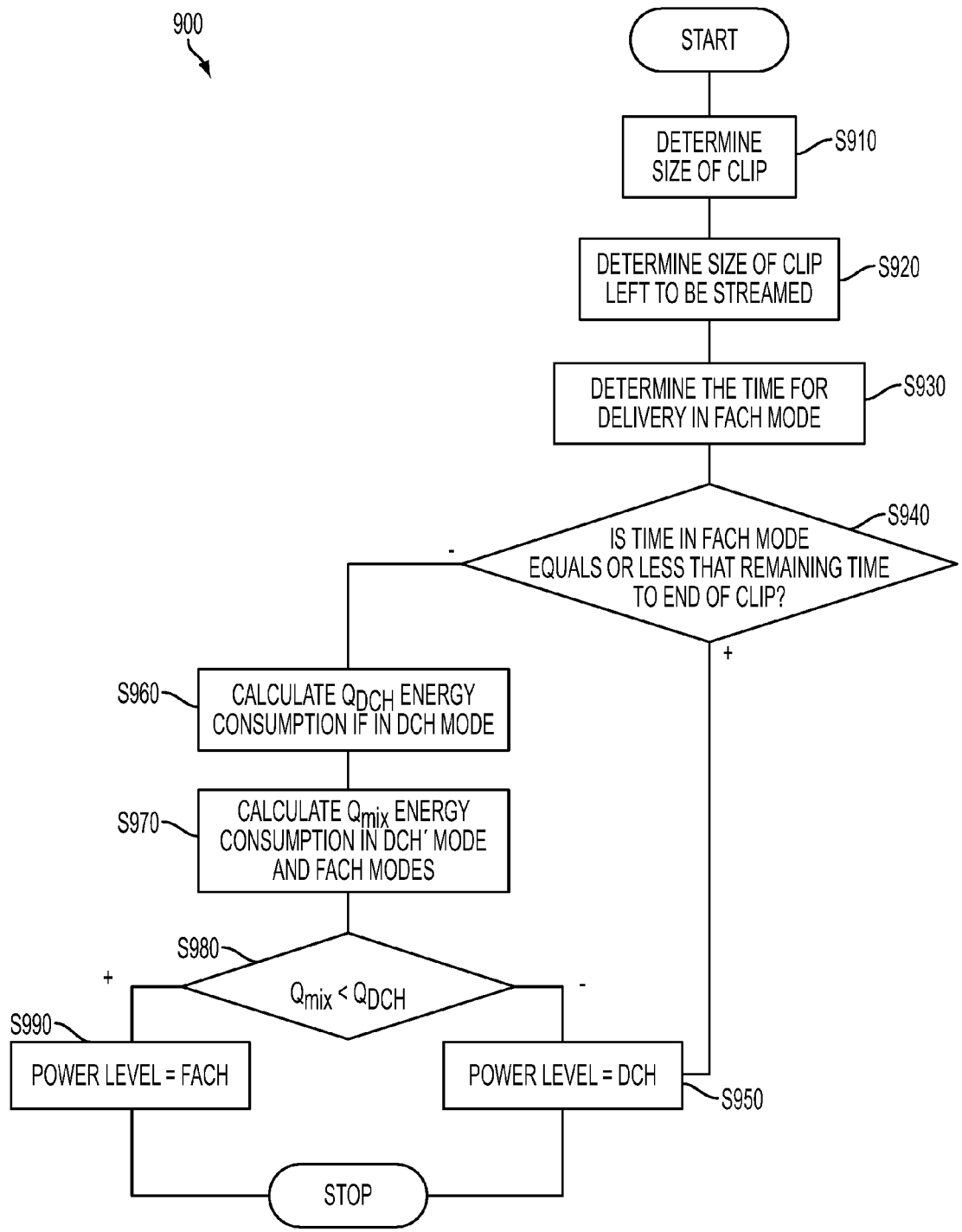
FIG. 9 is a flow diagram illustrating a method according to an exemplary embodiment.

FIG. 9 is a flow diagram illustrating a method 900 which is an exemplary embodiment of the algorithm that evaluates the used energy to determine a manner of transmitting the rest of the content (e.g., a clip) at S818. The method first determines the size of the clip, at S910, and the size of the clip left to be streamed (i.e., the rest of the content), at S920. Then, a time necessary to deliver the clip left to be streamed is calculated at S930. At S940, the calculated time is compared with a remaining time to the end of the clip. If the calculated time is equal to or less than the remaining time (i.e., the "+" branch), the rest of the clip is delivered using the DCH state, at S950.

The calculated time is compared with a remaining time to the end of the clip. If the calculated time is larger than the remaining time (i.e., the "−" branch), a first energy Q.sub.DCH used if the clip left to be streamed (i.e., the rest of the content) is streamed while the UE is in the DCH state is calculated at 960, and a second energy Q.sub.mix used if the clip left to be streamed (i.e., the rest of the content) is streamed while the UE is both in the DCH state and in the FACH state is calculated at S970.

The first energy Q.sub.DCH and the second energy Q.sub.mix are compared at S980. If first energy Q.sub.DCH is larger than the second energy Q.sub.mix (i.e., the "+" branch), at S990, the UE is reconfigured to the FACH state where it uses the lower power level. Otherwise (i.e., the "−" branch), the UE is maintained in the DCH state, S950.

Figure 10:
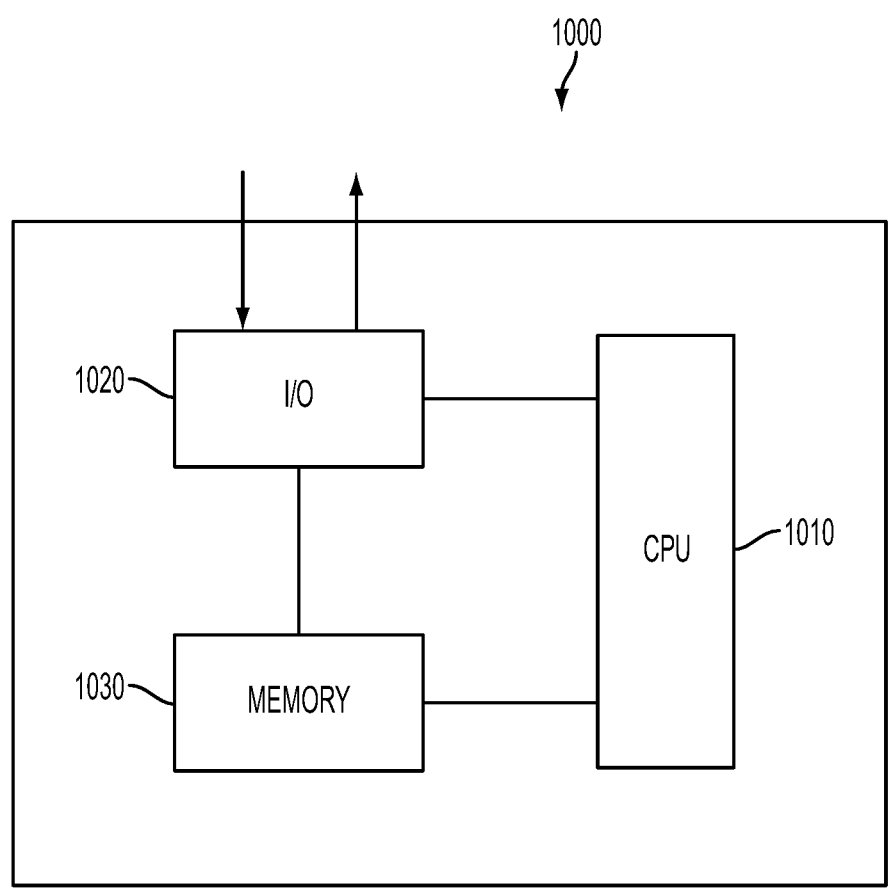
FIG. 10 is a schematic diagram of an apparatus according to an exemplary embodiment.

According to another exemplary embodiment, an apparatus 1000 capable to determine a manner in which multimedia content is delivered from a source proxy to a UE in a mobile network, while taking into consideration the user drop-out rate, and using the UE battery efficiently, may include an input/output interface 1010 and a processor 1020, as illustrated in FIG. 10. The controller 1000 may further include a computer readable storage medium 1030 storing software (i.e., executable codes) which, when executed by the processor 1020, determines the processor 1020 to optimize a manner in which multimedia content is delivered from a source proxy to a UE in a mobile network, while taking into consideration the user drop-out rate and using the UE battery efficiently.

Figure 11:
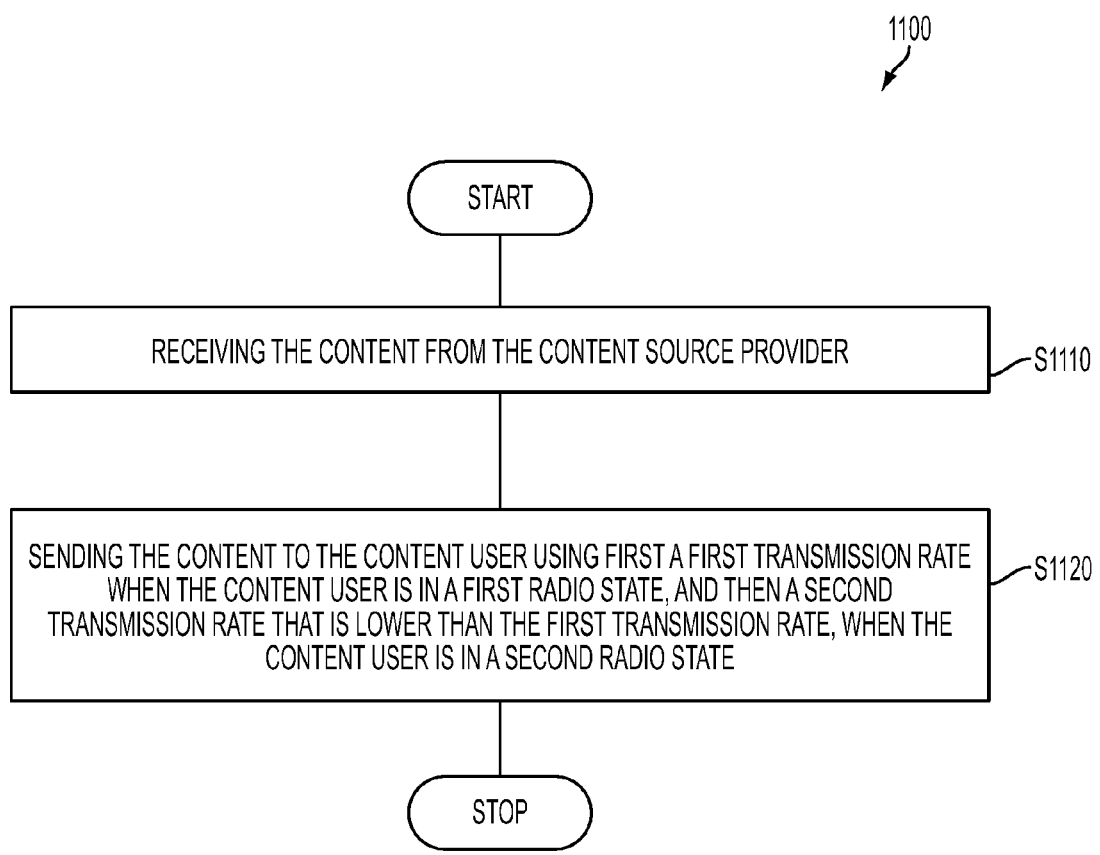
FIG. 11 is a flow diagram of a method according to an exemplary embodiment.

A flow diagram of a method 1100 employed in controlling a content delivery from a source proxy towards a UE in a mobile network, according to an exemplary embodiment, is illustrated in FIG. 11. The method 1100 includes receiving the content from the content source provider, at S1110, and sending the content to the content user using first a first transmission rate when the content user is in a first radio state, and then a second transmission rate that is lower than the first transmission rate, when the content user is in a second radio state. The content user uses a first battery power while in the first radio state, and a second battery power while in the second radio state, the second battery power being smaller than the first battery power. The sending is performed such that, (A) while delivering the content, an amount of the content already received by the content user to exceed an amount of the content used by the content user, and (B) to minimize a time during which the content user is in the first radio state.

In one embodiment, the method 1100 may further include sending respective state configuring signals to the content user before starting to send the content using the first transmission rate or using the second transmission rate. In the same or another embodiment, the proxy may communicate with the content user via a base station (NB), which is an eNodeB or a WiFi access point.

In one embodiment, the method 1100 may also include storing the content received from the content provider to be sent to the content user. The method 1100 may also include determining a first time interval for sending the content using the first transmission rate, based on a size of the content, a playout rate, the first transmission rate and the second transmission rate, the first transmission rate being larger than the playout rate.

In another embodiment, the method 1100 may further include receiving measurements of a delivery rate at which the content user receives the content, and sending a remaining portion of the content using the second transmission rate if the playout rate is smaller than a value of the delivery rate measured while the content user is in the second radio state after the first time interval. Besides these operations, the method may additionally include sending the remaining portion of the content using the second transmission rate if an estimated delivery time that is necessary for the content user to receive a remaining portion of the content according to the value of the delivery rate measured while the content user is in the second radio state, is less than a remaining time for the content user to entirely use the content. Further, in combination with these operations, the method may also include, if the estimated delivery time exceeds the remaining time for the content user to entirely use the content, calculating a first amount of energy used by the content user to receive the remaining portion of the content while in the first state, and a second amount of energy used by the content user to receive the remaining portion of the content while in the first state and in the second state, using a first battery power corresponding to the first radio state and a second battery power corresponding to the second radio state. The method 1100 would then also include sending the remaining portion of the content using the first transmission rate if the first amount of energy exceeds the second amount of energy, or sending the remaining content using the first transmission rate and the second transmission rate if the first amount of energy does not exceed the second amount of energy. In one embodiment, the method may also include estimating the remaining portion of the content using at least one value of the delivery rate measured while the content user is in the first radio state, during the first time interval, and at least one value of the delivery rate measured while the content user is in the second radio state, after the first time interval.

The disclosed exemplary embodiments provide controllers, methods and software for determining a manner in which multimedia content is delivered from a source proxy to a UE in a mobile network, while taking into consideration the user drop-out rate and using the UE battery efficiently. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the inventive concept. However, one skilled in the art would understand that various embodiments may be practiced without such specific details.

The exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. An apparatus configured to control delivering content from a content source provider to a content user (UE) in a mobile telecommunication network, comprising:
a processing unit configured
to receive the content from the content source provider, and
to send the content to the content user using first a first transmission rate when the content user is in a first radio state, and then a second transmission rate that is lower than the first transmission rate, when the content user is in a second radio state, the content user using a first battery power while in the first radio state, and using a second battery power while in the second radio state, the second battery power being smaller than the first battery power, such that,
while delivering the content, an amount of the content already received by the content user to exceed an amount of the content used by the content user, and
to minimize an energy used for delivering the content.

2. The apparatus of claim 1, wherein the processing unit is further configured to send respective state configuring signals to the content user before starting to send the content using the first transmission rate or using the second transmission rate.

3. The apparatus of claim 1, wherein the processing unit is configured to communicate with the content user via a base station (NB), which is eNodeB or a WiFi access point.

4. The apparatus of claim 1, further comprising a data storing unit configured to store the content received from the content provider to be sent to the content user.

5. The apparatus of claim 1, wherein the processing unit is further configured to determine a first time interval for sending the content using the first transmission rate, based on a size of the content, a playout rate at the UE, the first transmission rate and the second transmission rate, the first transmission rate being larger than the playout rate.

6. The apparatus of claim 5, wherein the processing unit is further configured to receive measurements of a delivery rate at which the network transmits the content to the user.

7. The apparatus of claim 6, wherein the processing unit is further configured to continue sending the content using the second transmission rate if the playout rate is smaller than a value of the delivery rate measured while the content user is in the second radio state after the first time interval.

8. The apparatus of claim 7, wherein the processing unit is further configured to continue sending the content using the second transmission rate if an estimated delivery time that is necessary for the content user to receive a remaining content according to the value of the delivery rate measured while the content user is in the second radio state, is less than a remaining time for the content user to entirely use the content.

9. The apparatus of claim 8, wherein if the estimated delivery time exceeds the remaining time, the processing unit is further configured
to calculate a first amount of energy ($Q_{DCH}$) used by the content user to receive the remaining content while in the first state, and a second amount of energy ($Q_{mix}$) used by the content user to receive the remaining content while in the first state and in the second state, using a first battery power corresponding to the first radio state and a second battery power corresponding to the second radio state, and
to send the remaining content using the first transmission rate if the first amount of energy exceeds the second amount of energy, and to send the remaining content using the first transmission rate and the second transmission rate if the first amount of energy does not exceed the second amount of energy.

10. The apparatus of claim 8, wherein the processing unit is configured to estimate the remaining content using at least one value of the delivery rate measured while the content user is in the first radio state, during the first time interval and at least one value of the delivery rate measured while the content user is in the second radio state, after the first time interval.

11. A method for managing a delivery of content from a content source provider to a content user (UE) in a telecommunication network, comprising:
receiving the content from the content source provider; and
sending the content to the content user using first a first transmission rate when the content user is in a first radio state, and then a second transmission rate that is lower than the first transmission rate, when the content user is in a second radio state, the content user using a first battery power while in the first radio state, and using a second battery power while in the second radio state, the second battery power being smaller than the first battery power, the sending being performed such that,
while delivering the content, an amount of the content already received by the content user to exceed an amount of the content used by the content user, and to minimize an energy used by the content user.

12. The method of claim 11, further comprising:
sending respective state configuring signals to the content user before starting to send the content using the first transmission rate or using the second transmission rate.

13. The method of claim 11, wherein the proxy communicates with the content user via a base station (NB), which is an eNodeB or a WiFi access point.

14. The method of claim 11, further comprising:
storing the content received from the content provider to be sent to the content user.

15. The method of claim 11, further comprising:
determining a first time interval for sending the content using the first transmission rate, based on a size of the content, a playout rate, the first transmission rate and the second transmission rate, the first transmission rate being larger than the playout rate.

16. The method of claim 15, further comprising:
receiving measurements of a delivery rate at which the content user receives the content, and
sending a remaining portion of the content using the second transmission rate if the playout rate is smaller than a value of the delivery rate measured while the content user is in the second radio state after the first time interval.

17. The method of claim 16, further comprising:
sending the remaining portion of the content using the second transmission rate if an estimated delivery time that is necessary for the content user to receive a remaining portion of the content according to the value of the delivery rate measured while the content user is in the second radio state, is less than a remaining time for the content user to entirely use the content.

18. The method of claim 17, further comprising:
if the estimated delivery time exceeds the remaining time for the content user to entirely use the content, calculating a first amount of energy used by the content user to receive the remaining portion of the content while in the first state, and a second amount of energy used by the content user to receive the remaining portion of the content while in the first state and in the second state, using a first battery power corresponding to the first radio state and a second battery power corresponding to the second radio state, and
sending the remaining portion of the content using the first transmission rate if the first amount of energy exceeds the second amount of energy, or sending the remaining content using the first transmission rate and the second transmission rate if the first amount of energy does not exceed the second amount of energy.

19. The method of claim 17, further comprising:
estimating the remaining portion of the content using at least one value of the delivery rate measured while the content user is in the first radio state, during the first time interval, and at least one value of the delivery rate measured while the content user is in the second radio state, after the first time interval.

20. A computer readable medium storing executable codes which, when executed on a computer, make the computer to perform a method for managing a delivery of content from a content source provider to a content user (UE) in a communication network, comprising:
receiving the content from the content source provider; and
sending the content to the content user using first a first transmission rate when the content user is in a first radio state, and then a second transmission rate that is lower than the first transmission rate, when the content user is in a second radio state, such that,
while delivering the content, an amount of the content already received by the content user to exceed an amount of the content used by the content user, and to minimize an energy used by the content user.

* * * * *

UNITED STATES PATENT AND TRADEMARK OFFICE
CERTIFICATE OF CORRECTION

PATENT NO. : 8,965,351 B2  
APPLICATION NO. : 13/375690  
DATED : February 24, 2015  
INVENTOR(S) : Damola et al.

Page 1 of 1

It is certified that error appears in the above-identified patent and that said Letters Patent is hereby corrected as shown below:

In the Claims

In Column 2, Line 10, delete "may be be" and insert -- may be --, therefor.

Signed and Sealed this
Twenty-ninth Day of September, 2015

Michelle K. Lee
*Director of the United States Patent and Trademark Office*